United States Patent
Giessler et al.

(10) Patent No.: US 8,757,049 B2
(45) Date of Patent: Jun. 24, 2014

(54) PREPARATION DEVICE FOR A BEVERAGE, IN PARTICULAR FOR ICED TEA

(71) Applicant: Blomus GmbH, Sundern (DE)

(72) Inventors: Holm Giessler, Essen (DE); Frederik Dully, Soest (DE)

(73) Assignee: Blomus GmbH, Sundern (DE)

( * ) Notice: Subject to any disclaimer, the term of this patent is extended or adjusted under 35 U.S.C. 154(b) by 0 days.

(21) Appl. No.: 14/102,421

(22) Filed: Dec. 10, 2013

(65) Prior Publication Data
US 2014/0083303 A1 Mar. 27, 2014

Related U.S. Application Data

(63) Continuation of application No. PCT/EP2012/072749, filed on Nov. 15, 2012.

(30) Foreign Application Priority Data

Apr. 7, 2012 (DE) .......................... 10 2012 008 534

(51) Int. Cl.
*A47J 31/02* (2006.01)
(52) U.S. Cl.
USPC .......................................................... 99/306
(58) Field of Classification Search
CPC . A47J 31/005; A47J 31/0605; A47J 31/0621; A47J 31/0642; A47J 31/06; A47J 31/0626; A47J 31/0636; A47J 31/0615; A47J 31/00; A47G 19/16; A47G 19/22
USPC ........... 99/322–323, 316–319, 299, 305, 297; 222/129, 143–145; 206/139–144
See application file for complete search history.

(56) References Cited

U.S. PATENT DOCUMENTS

| | | | |
|---|---|---|---|
| 3,924,741 A | 12/1975 | Kachur et al. | |
| 5,570,623 A * | 11/1996 | Lin | 99/285 |
| 5,632,194 A * | 5/1997 | Lin | 99/285 |
| 5,638,968 A | 6/1997 | Baron | |
| 5,813,317 A * | 9/1998 | Chang | 99/285 |
| 5,862,739 A * | 1/1999 | Lin | 99/285 |

(Continued)

FOREIGN PATENT DOCUMENTS

| | | |
|---|---|---|
| DE | 569372 | 1/1933 |
| GB | 477203 | 12/1937 |
| WO | 2004008925 A1 | 1/2004 |
| WO | 2010107867 | 9/2010 |

OTHER PUBLICATIONS

International Search Report of PCT/EP2012/072749, dated Mar. 15, 2013.

*Primary Examiner* — Dana Ross
*Assistant Examiner* — Renee L Miller
(74) *Attorney, Agent, or Firm* — Cohen & Hildebrand, PLLC

(57) ABSTRACT

Preparation device for a beverage (8), in particular for iced tea, with a lower container (1) for receiving the beverage (8). A starting material (15) for preparing the beverage (8) is received in a receiving structure (3), while a retaining structure (2) secures the receiving structure (3) in the lower container (1). The receiving and retaining structures are moveable relative to each other between a first relative position, in which a liquid (16) residing in the receiving structure (3) cannot exit into the lower container (1), into a second relative position, in which the liquid (16) residing in the receiving structure (3) is allowed to exit into the lower container (1).

17 Claims, 4 Drawing Sheets

(56) References Cited

U.S. PATENT DOCUMENTS

Figure 1:
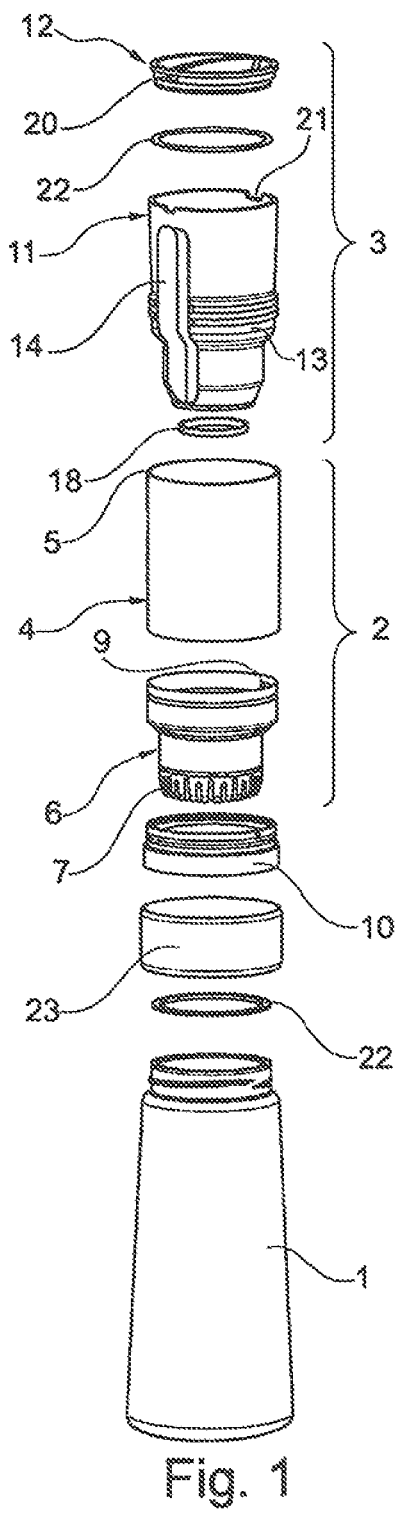

| | | |
|---|---|---|
| 5,880,441 A | 3/1999 | Hartman et al. |
| 5,913,964 A * | 6/1999 | Melton .................. 99/322 |
| 5,942,143 A | 8/1999 | Hartman et al. |
| 5,943,946 A * | 8/1999 | Chen .................. 99/297 |
| 5,947,004 A * | 9/1999 | Huang .................. 99/299 |
| 6,045,254 A | 4/2000 | Inbar et al. |
| 6,276,262 B1 * | 8/2001 | Chen .................. 99/322 |
| 6,372,270 B1 | 4/2002 | Denny |
| 6,844,015 B2 * | 1/2005 | Yuguchi .................. 426/78 |
| 7,073,428 B2 * | 7/2006 | Chung et al. .................. 99/283 |
| 7,306,117 B2 | 12/2007 | Roth |
| 2004/0154471 A1 * | 8/2004 | Tardif .................. 99/279 |
| 2009/0178573 A1 * | 7/2009 | Pan .................. 99/323 |
| 2010/0263549 A1 * | 10/2010 | Lee .................. 99/319 |
| 2011/0056386 A1 * | 3/2011 | Taketani .................. 99/317 |
| 2011/0226133 A1 * | 9/2011 | Shen .................. 99/316 |
| 2012/0012008 A1 * | 1/2012 | Kwok .................. 99/297 |
| 2013/0146486 A1 | 6/2013 | Justus et al. |

* cited by examiner

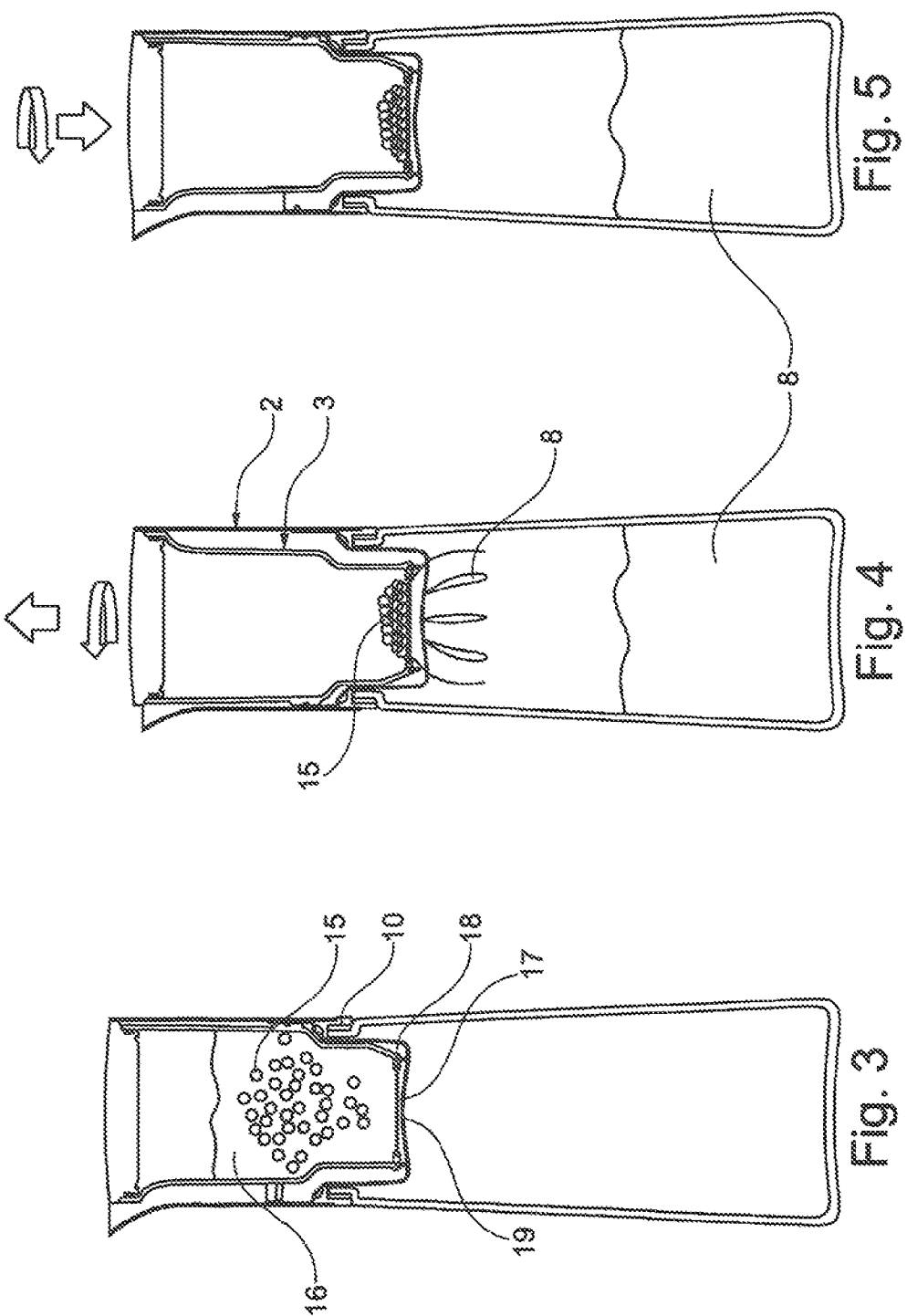

US 8,757,049 B2

PREPARATION DEVICE FOR A BEVERAGE, IN PARTICULAR FOR ICED TEA

CROSS-REFERENCE TO RELATED APPLICATIONS

This application is a continuation of International Application No. PCT/EP2012/072749, filed Nov. 15, 2012, which claims priority to German Patent Application No. DE 10 2012 008 534.6, filed on Apr. 7, 2012, each of which is herein incorporated by reference in its entirety.

BACKGROUND OF THE INVENTION

1. Field of the Invention

The present invention relates to a preparation device for a beverage, in particular for iced tea. Furthermore, the present invention relates to a process for the preparation of a beverage, in particular for the preparation of iced tea.

2. Description of Related Art

A preparation device and method of the aforementioned type are known for example from the WO 2010/107867 A1 which is herein incorporated by reference in its entirety. The device described therein has a container in which retaining means hold a receptacle for tea leaves that can be screwed in downwardly. In its lower position, the receptacle can be brought in contact with hot water disposed in the container. When the receptacle is in the upper position, the brewing process is completed, because the tea is then no longer in contact with the hot water.

Disadvantageously, however, use of the device for preparing iced tea is, on one hand, cumbersome because hot water is poured in the container. On the other hand, the prepared beverage cannot be poured out when the retaining means are inside container.

SUMMARY OF THE INVENTION

Starting from this prior art, it is the object of the present invention to further develop a preparation device and method of the aforedescribed type which makes it easier to prepare iced tea and/or with which the prepared beverage can be more easily poured.

One aspect of the present invention is directed to a preparation device for a beverage. The present inventive preparation device includes a lower container for receiving the beverage; a receiving structure in which a starting material is received in preparing of the beverage; and a retaining structure having a spout. The receiving structure is secured in the lower container by the retaining structure. Furthermore, the receiving structure and the retaining structure are movable relative to one another between a first relative position in which a liquid residing in the receiving structure cannot exit into the lower container, to a second relative position, in which the liquid residing in the receiving structure is allowed to exit into the lower container.

Another aspect of the present invention relates to a preparation device for a beverage. The present inventive preparation device includes: a lower container for receiving the beverage; a receiving structure in which a starting material is received in preparing of the beverage; and a retaining structure including a cylindrical top part. The receiving structure includes an upper container for receiving the starting material and the receiving structure is secured in the lower container by the retaining structure. In addition, the receiving structure and the retaining structure are movable relative to one another between a first relative position in which a liquid residing in the receiving structure cannot exit into the lower container, to a second relative position, in which the liquid residing in the receiving structure is allowed to exit into the lower container. Moreover, the receiving structure and the retaining structure are configured so that the beverage is pourable out of the lower container through a space between the cylindrical top part and the upper container.

Yet another aspect of the present invention is directed to a preparation device for a beverage. The present inventive preparation device includes: a lower container for receiving the beverage; a receiving structure in which a starting material is received in preparing of the beverage; and a retaining structure. The receiving structure is secured in the lower container by the retaining structure. Furthermore, the receiving structure and the retaining structure are movable relative to one another between a first relative position in which a liquid residing in the receiving structure cannot exit into the lower container, to a second relative position, in which the liquid residing in the receiving structure is allowed to exit into the lower container. In addition, the receiving structure includes an upper container for receiving the starting material and a rotary part with a rotationally fixed connection therebetween, wherein the upper container is rotatable by grasping and rotating the rotary part.

While still another aspect of the present invention is directed to a method for the preparation of ice tea using the preparation device as described in one of the preceding paragraphs. Initially, pieces of ice are introduced into a lower container (1). The retaining structure (2) and receiving structure (3) are attached on to the lower container (1) and together they are moved to a first relative position. A starting material (15) and a liquid (16) required for the preparation of the beverage are introduced into the receiving structure (3). Subsequent to an interaction between starting material (15) and liquid (16), the receiving structure (3) and the retaining structure (2) are moved to a second relative position, so that the beverage (8) produced by the interaction can flow into the lower container (1). Then, the receiving structure (3) and the retaining structure (2) are moved to the first relative position. Now the beverage (8) is pourable at least partly out of the lower container (1). Furthermore, the receiving structure (3) and the retaining structure (2) may be moved into the second relative position by a rotary movement combined with a vertical translation movement during use.

Figure 2:
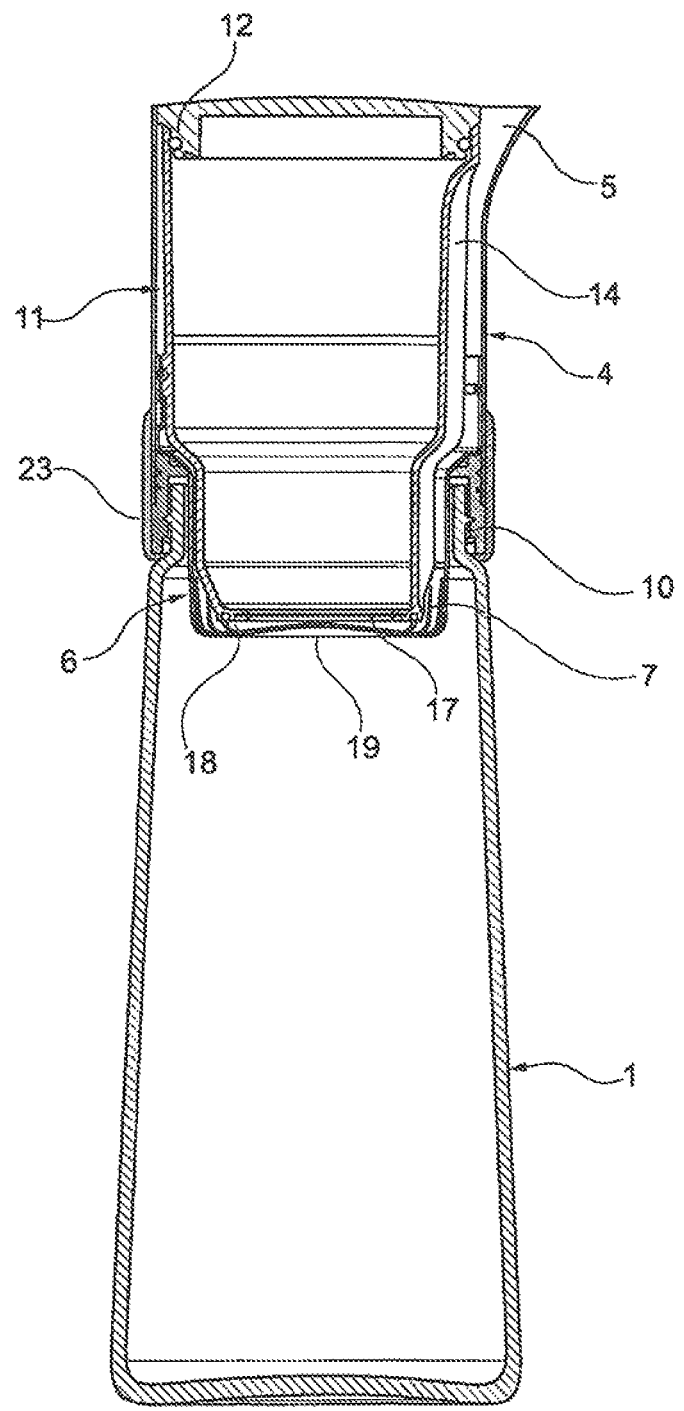
Figure 6:
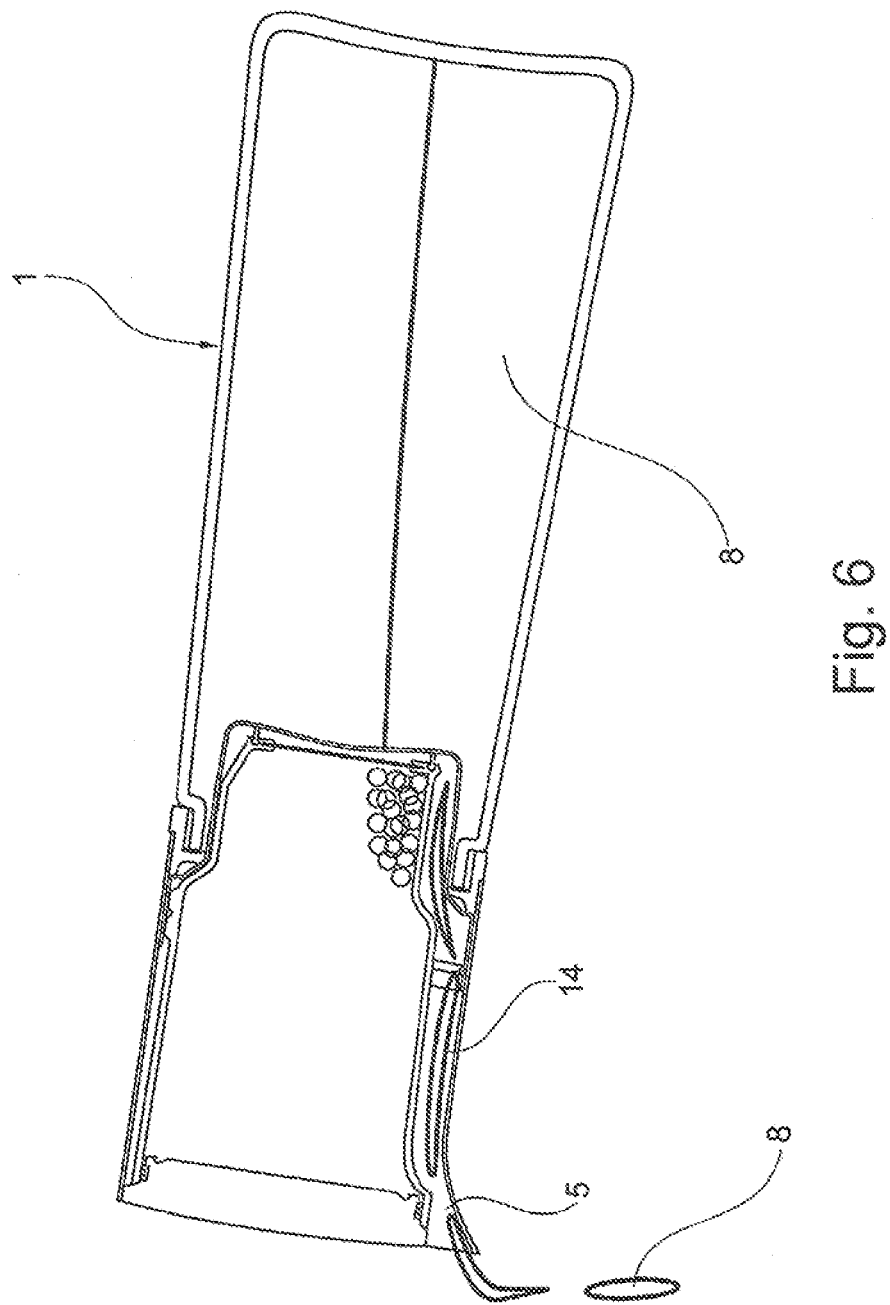

Additional features and advantages of the present invention will become apparent from the following description of preferred embodiments with reference to the appended drawings, which show in FIG. 1 an exploded view of a preparation device according to the present invention;

FIG. 2 a sectional view of the preparation device of FIG. 1;

FIG. 3 a schematic sectional view of another preparation device according to the present invention with the receiving structure and the retaining structure in the first relative position, and the stalling material and the liquid in the receiving structure;

FIG. 4 a view corresponding to FIG. 3 with the receiving structure and the retaining structure in the second relative position, wherein the prepared beverage flows from the receiving structure into the lower container;

FIG. 5 a view corresponding to FIG. 3 with the receiving structure and the retaining structure in the first relative position, wherein the prepared beverage is inside the lower container;

FIG. 6 a view corresponding to FIG. 3 with the receiving structure and the retaining structure in the first relative position, wherein the prepared beverage flows out of the lower container.

In the figures, identical or functionally equivalent parts are designated by identical reference numerals.

DETAILED DESCRIPTION OF THE INVENTION

The illustrated preparation device according to the present invention includes a lower container 1 formed of, for example, a glass decanter. The preparation device further includes a retaining structure 2 and a receiving structure 3.

The retaining structure 2 include a tubular top part 4 provided with a spout 5 (see also, for example, FIG. 2) and a base 6 connected or connectable with the top part 4, which has slits 7 disposed in the lower side region for the passage of the prepared beverage 8, as well as an attachment 10 fixedly connected with the top part 4.

The bottom of the base 6 has at least a central portion 19 which is devoid of slots or openings. The base 6 includes parts of an inner thread 9. The base 6 is in the operative state placed on the lower container 1 by way of the attachment 10.

The receiving structure 3 include an upper container 11 and a rotary part 12 that can be placed on top of the upper container 11 so that a rotationally fixed connection is formed between the upper container 11 and rotary part 12. For this purpose, the rotary part 12 has, for example, two downwardly extending projections 20 configured to engage in recesses 21 in the upper container 11. To pour liquid 16 into the upper container 11, the rotary part 12 can be removed from the upper container 11 and placed on the upper container 11 again after the liquid 16 has been poured.

The upper container 11 has on its bottom side a screen 17 through which the prepared beverage 8 can exit. The screen 17 may be made of stainless steel. Furthermore, the screen 17 may be surrounded by a circumferential, downwardly extending seal 18. The diameter of the screen 17 is equal to or less than the region 19 of the bottom of the base 6 that is devoid of slots or openings (see FIG. 2).

The upper container 11 has on its outer surface an external thread 13 which can engage in the inner thread 9 of the base 6. The upper container 11 can be rotated by grasping the rotary member 12 and rotating the rotary member 12. Furthermore, a vertical groove 14 is disposed on the outer surface of the upper container 11 through which the prepared beverage 8 can flow.

FIG. 1 also shows a plurality of sealing rings 18, 22 made in particular from silicone. Also shown is a sleeve 23, which may also be made of silicone and which may surround or cover the connecting portion between the attachment 10 and the top part 4. The sleeve 23 performs an important function of thermally insulating the top part 4, which can become very hot during use.

FIGS. 3 to 6 show another preparation device according to the present invention, which differs from the preparation device illustrated in FIG. 1 and FIG. 2 essentially by the absence of a sleeve 23.

FIG. 3 shows the preparation device in a first relative position of the receiving structure 3 and the retaining structure 2. In this position, the upper container 11 is completely screwed into the base 6. In this case, the bottom portion 19 of the base 6 devoid of the slits or openings is in contact with the seal 18 surrounding the screen 17 of the upper container 11, thereby preventing liquid from exiting downwardly through the screen 17 and through the slots 7, respectively.

In the state shown in FIG. 3, starting material 15 required for the preparation and liquid 16 required for the preparation are introduced into the upper container 11. These may be, for example, tea and hot water.

After a predetermined brewing time, the user may unscrew the upper container 11 upwardly or move the upper container 11 into the second relative position, thereby allowing the prepared beverage 8, in particular the prepared tea, to exit downwardly into the lower container 1 through the screen 17 and the slits 7 (see FIG. 4). When iced tea is to be prepared, the lower container 1 may be at least partially filled with ice cubes.

Thereafter, the upper container 11 is screwed downwardly or moved to the first relative position, respectively, in which liquid cannot exit downwardly from the upper container 11 or the beverage 8 cannot enter the upper container 11 when the beverage 8 is poured (see FIG. 5).

FIG. 6 shows pouring of the beverage 8 from the lower container 1 through the groove 14.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

Every issued patent, pending patent application, publication, journal article, book or any other reference cited herein is each incorporated by reference in their entirety.

What is claimed is:

1. Preparation device for a beverage (8) comprising:
a lower container (1) for receiving the beverage (8);
a receiving structure (3) in which a starting material (15) is received in preparing of the beverage (8);
a retaining structure (2) having a spout, the receiving structure (3) is secured in the lower container (1) by the retaining structure (2);
wherein the receiving structure (3) and the retaining structure (2) are movable relative to one another: wherein the movement of the receiving and retaining structures relative to each other is a rotary movement in combination with a vertical translational movement during use; wherein the receiving and retaining structures are movable relative to one another between a first relative position in which a liquid (16) residing in the receiving structure (3) cannot exit into the lower container (1), to a second relative position, in which the liquid (16) residing in the receiving structure (3) is allowed to exit into the lower container (1).

2. The preparation device according to claim 1, wherein the receiving structure (3) comprises at least one opening or a screen (17) for the discharge of the liquid (16); and wherein the at least one opening or the screen (17) is covered or closed in the first relative position by the retaining structure (2).

3. The preparation device according to claim 1, wherein the beverage (8) is pourable out of the lower container (1) when the retaining structure (2) disposed in the lower container (1) is in the first relative position.

4. The preparation device according to claim 1, wherein the retaining structure (2) and/or the receiving structure (3) comprise a groove (14) or recess through which the beverage (8) is pourable out of the lower container (1).

5. The preparation device according to claim 1, further comprising a heat-insulating sleeve (23) covering a transition region between the retaining structure (2) and the lower container (1).

6. Preparation device for a beverage (8) comprising:
a lower container (1) for receiving the beverage (8);
a receiving structure (3) in which a starting material (15) is received in preparing of the beverage (8); wherein the receiving structure (3) comprises an upper container (11) for receiving the starting material (15);
a retaining structure (2) including a cylindrical top part (4), the receiving structure (3) is secured in the lower container (1) by the retaining structure (2);
wherein the receiving structure (3) and the retaining structure (2) are movable relative to one another: wherein the movement of the receiving and retaining structures relative to each other is a rotary movement in combination with a vertical translational movement during use; wherein the receiving and retaining structures are movable relative to one another between a first relative position in which a liquid (16) residing in the receiving structure (3) cannot exit into the lower container (1), to a second relative position, in which the liquid (16) residing in the receiving structure (3) is allowed to exit into the lower container (1);
wherein the receiving structure (3) and the retaining structure (2) are configured so that the beverage (8) is pourable out of the lower container (1) through a space between the cylindrical top part (4) and the upper container (11).

7. The preparation device according to claim 6, wherein the receiving structure (3) comprises at least one opening or a screen (17) for the discharge of the liquid (16); and wherein the at least one opening or the screen (17) is covered or closed in the first relative position by the retaining structure (2).

8. The preparation device according to claim 6, wherein the beverage (8) is pourable out of the lower container (1) when the retaining structure (2) disposed in the lower container (1) is in the first relative position.

9. The preparation device according to claim 6, wherein the retaining structure (2) and/or the receiving structure (3) comprise a groove (14) or recess through which the beverage (8) is pourable out of the lower container (1).

10. The preparation device according to claim 6, further comprising a heat-insulating sleeve (23) covering a transition region between the retaining structure (2) and the lower container (1).

11. Preparation device for a beverage (8) comprising:
a lower container (1) for receiving the beverage (8);
a receiving structure (3) in which a starting material (15) is received in preparing of the beverage (8);
a retaining structure (2), the receiving structure (3) is secured in the lower container (1) by the retaining structure (2);
wherein the receiving structure (3) and the retaining structure (2) are movable relative to one another: wherein the movement of the receiving and retaining structures relative to each other is a rotary movement in combination with a vertical translational movement during use; wherein the receiving and retaining structures are movable relative to one another between a first relative position in which a liquid (16) residing in the receiving structure (3) cannot exit into the lower container (1), to a second relative position, in which the liquid (16) residing in the receiving structure (3) is allowed to exit into the lower container (1);
wherein the receiving structure (3) comprises an upper container (11) for receiving the starting material (15) and a rotary part (12) with a rotationally fixed connection therebetween, wherein the upper container (11) is rotatable by grasping and rotating the rotary part (12).

12. The preparation device according to claim 11, wherein the receiving structure (3) comprises at least one opening or a screen (17) for the discharge of the liquid (16); and wherein the at least one opening or the screen (17) is covered or closed in the first relative position by the retaining structure (2).

13. The preparation device according to claim 11, wherein the beverage (8) is pourable out of the lower container (1) when the retaining structure (2) disposed in the lower container (1) is in the first relative position.

14. The preparation device according to claim 11, wherein the retaining structure (2) and/or the receiving structure (3) comprise a groove (14) or recess through which the beverage (8) is pourable out of the lower container (1).

15. The preparation device according to claim 11, further comprising a heat-insulating sleeve (23) covering a transition region between the retaining structure (2) and the lower container (1).

16. The preparation device according to claim 1, wherein the receiving structure is in direct physical contact with the retaining structure.

17. The preparation device according to claim 11, wherein the receiving structure is in direct physical contact with the retaining structure.

* * * * *